United States Patent [19]

Winther

[11] 3,827,393

[45] Aug. 6, 1974

[54] VEHICLE TIRE DEFLATION SIGNALLING MEANS

[75] Inventor: Harry C. Winther, Glen Mills, Pa.

[73] Assignees: Walter J. Winther; Charles R. Winther; William J. Winther; Shirley M. Winther, Glen Mills, Pa. ; part interest to each

[22] Filed: Feb. 15, 1973

[21] Appl. No.: 332,776

Related U.S. Application Data

[63] Continuation-in-part of Ser. No. 113,566, Feb. 8, 1971, Pat. No. 3,717,845.

[52] U.S. Cl............. 116/34 R, 73/146.8, 200/61.25
[51] Int. Cl............................................ B60c 23/06
[58] Field of Search....... 116/34 R; 73/146.2, 146.3, 73/146.8, 419; 200/61.25; 340/58

[56] References Cited
UNITED STATES PATENTS

| | | | |
|---|---|---|---|
| 1,467,317 | 9/1923 | Harris | 116/34 R |
| 1,686,165 | 10/1928 | Morse | 73/146.8 |
| 2,948,256 | 8/1960 | Tapp | 116/34 R |
| 3,717,845 | 2/1973 | Winther | 340/58 |

Primary Examiner—Louis J. Capozi
Attorney, Agent, or Firm—W. Wyclif Walton

[57] ABSTRACT

An attachment for a pneumatic tire for a vehicle or the like which contains a pressure-differential-responsive valve communicating with the interior of the tire and operative to activate a conspicuously decorated signal making unit to cause the unit to be displayed for visual observation when air pressure in the tire for any reason is reduced to a predetermined undesirably low value, whereby an observer may ascertain that the tire is under-inflated and thus in a possibly hazardous condition.

6 Claims, 7 Drawing Figures 3,827,393

VEHICLE TIRE DEFLATION SIGNALLING MEANS

CROSS REFERENCE TO RELATED APPLICATION

This application is a continuation-in-part of my copending appliction Ser. No. 113,566 for U.S. Letters Patent for VEHICLE TIRE DEFLATION SIGNALLING SYSTEM, filed Feb. 8, 1971, now U.S. Letters Pat. No. 3,717,845, granted Feb. 20, 1973.

BACKGROUND OF THE INVENTION

Modern automotive vehicle tires, especially those used on heavy trucks and buses, and more especially when dual wheels are employed, often do not immediately affect the riding qualities of the vehicle sufficiently to be perceptible to the operator upon significant loss of internal pressure, although continued operation of the vehicle with an underinflated tire may and often does result in irreparable damage to the tire.

There have consequently been proposed many systems, of varying reliability, for conveying to a vehicle operator intelligence of the condition of the tires of his vehicle, and more particularly systems for communicating a visual or audible signal to the operator's station when deflation to a significant degree has occurred and in my prior copending application one of these is disclosed which has been proved eminently satisfactory, particularly when installed in relatively large and heavy vehicles such as trucks and buses, although it is useful as well for smaller vehicles. It has, however, sometimes been deemed too complex for general passenger car use and the like and the present invention is directed to providing relatively simple means affording warning of deflation of an individual tire upon relatively casual inspection from a distance, although not automatically at a central point while the vehicle is in operation as is the case with the said prior system.

SUMMARY OF THE INVENTION

While as suggested the indicating means of the presnet invention does not convey a direct signal to a vehicle operator while the vehicle is in operation it does provide means whereby before or after operating the vehicle the operator may ascertain at a glance whether the vehicle tires are retaining adequate pressure. Moreover the visual signal of significant deflation exhibited at the individual wheels is of such conspicuous nature as not readily to be overlooked on even the most casual inspection, and is visible to others, such as pedestrians and passing motorists, who may then communicate by an appropriate signal to the operator independently of the indicating means, which so far as is known has not been true of any deflation indicating means suggested in the prior art.

Consequently the present invention contemplates utilizing a pressure-differential-responsive valve communicating with the interior of the pneumatic tire of a vehicle wheel or the like, which valve may be one generally comparable to that employed in my said prior signalling system, the valve being conveniently attached to the standard valve stem through which the tire is normally inflated, or it may communicate directly with the tire, as through the wheel rim, and in effect replace the standard valve and valve stem if preferred. In accordance with the present invention, however, said valve, instead of activating a switching unit for energizing an electrical signalling system, is mechanically connected directly to a conspicuously positioned and caparisoñed signalling unit comprising a rod, plunger or the like which, while normally concealed within a housing, on significant loss of pressure in the tire, is forceably projected outwardly therefrom to attract visual attention and thereby to indicate to an observer the possibly hazardous condition of the tire.

DESCRIPTION OF THE PREFERRED EMBODIMENT

Figure 1:
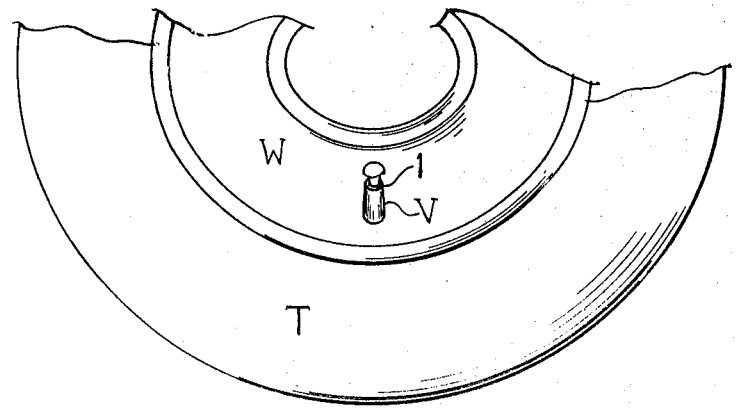
FIG. 1 is a fragmentary front elevation showing my deflation warning unit affixed to the valve stem of the pneumatic tire on a typical vehicle wheel.
Figure 2:
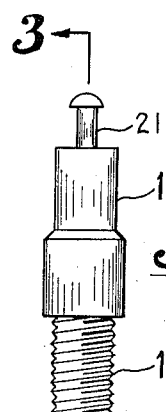
FIG. 2 is an enlarged fragmentary side elevation of the unit.
Figure 3:
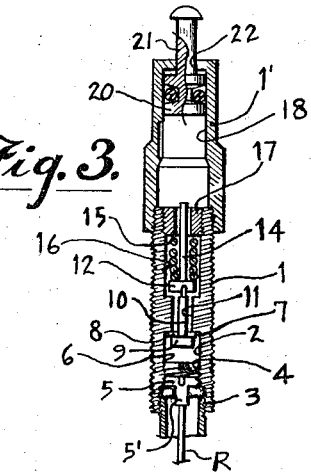
FIG. 3 is an axial section of the unit on the scale of FIG. 2.
Figure 4:
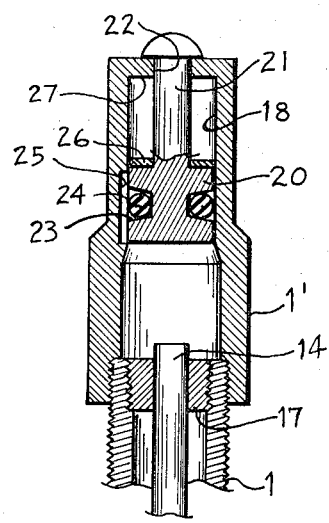
FIG. 4 is a further enlarged fragmentary section showing the signalling plunger in normal position for indicating a properly inflated tire.

Referring now more particularly to the drawing it will be apparent that vehicle wheel W and pneumatic tire T are but representative of environments in which my signalling means is deemed most useful and they may be of any desired specific construction, the invention being embodied in a substantially cylindrical housing 1, which may or may not be externally threaded throughout its length, having an axial bore generally designated 2, communicating through a standard valve stem V with the interior of the tire; comprising several end-to-end zones, of which that at one end is provided with internal threads complementary to the usual external threads at the end of the valve stem. Inwardly of this bore from the threaded zone 3 is a second internally threaded zone 4 of somewhat lesser diameter than the zone 3, in which is seated an externally threaded valve depressor 5, having an axially projecting boss 5' adapted when the housing is positioned on the valve stem to engage and depress the rod R of the standard valve body (not shown) in the valve stem V to hold this valve open and thus insure communication between the housing bore and the interior of the tire.

Inwardly from zone 4 is a smooth-bore valve chamber 6 having at its remote end a flat valve seat 7 receiving a relatively resilient annular gasket or washer 8 on which normally there is seated poppet 9 of a pressure-differential-responsive valve comprising poppet 9, rod 10, extending in a bore 11 of reduced diameter in housing 1 and having its free end seated in a complementary axial bore of the head 12 of a follower whose shaft 14 is encompassed within a coil spring 15 disposed in an enlarged zone 16 of the bore 2.

At the opposite end of this zone there is positioned a threaded bushing 17 receiving the end of shaft 14 and providing a seat for spring 15, biased against head 12 and hence tending to maintain poppet 9 unseated from gasket 8.

An extension of housing 1 comprising a cylindrical cap 1' is threaded on housing 1 and in its axial bore 18 it carries a piston comprising a head 20 and supporting rod 21, the latter extending through an axial hole 22 in the end of cap 1'. The piston head 20 has a peripheral groove 23 in which is seated a resilient O-ring 24 which with the head 20 seals the bore 18 of cap 1' except for a minute longitudinal groove 25 which provides a by-pass channel for escape of air from housing 1 past the piston head 20 under certain conditions as will hereinafter more fully appear.

The supporting rod 21 secured to piston head 20 is normally contained substantially entirely within the housing extension 1' but is preferably distinctively colored or otherwise made visually conspicuous so as readily to be observed when projected axially from the housing for a substantial proportion of its length and carries adjacent head 20 an annular gasket 26 engageable with a seat 27 formed in the extension 1' to inhibit escape of air from the tire released by the pressure-differential-responsive valve.

The housing extension 1' is preferably provided with longitudinal groove 25 which permits gradual escape past piston head 20 of air passing in a relatively slow leak from the pressure-differential-responsive valve as when for example a particle of foreign matter may become lodged between the poppet 9 and gasket 8 of that valve.

OPERATION OF THE PREFERRED EMBODIMENT

When the signalling means just described is positioned on the valve stem V of a properly inflated vehicle tire T it will be apparent the standard valve, being held open by boss 5' is not effective to maintain pressure in the tire. That pressure, therefore, is resolved against the poppet 9 of the pressure-differential-responsive valve to keep said poppet seated on gasket 8 to maintain pressure in the tire, that pressure reacting against poppet 9 readily overcoming the bias of spring 15 which tends to unseat the poppet from gasket 8 when the tire pressure declines to a predetermined value.

Hence when the tire pressure declines for any reason, such as a puncture or the like, and the pressure reacting against the poppet head thus becomes insufficient to overcome the bias of spring 15 the valve poppet 9 becomes unseated, releasing air from within the tire and allowing it to fill the bores in housing 1 and extension 1' instantaneously, thereby immediately driving piston head 20 to the outer limit of its travel and exposing a substantial proportion of the length of its supporting rod 21 to view from without the extension 1'. This condition of the rod may readily be observed by the operator on even the most casual inspection of his vehicle, and usually be observed by passers by, on foot or in other vehicles, who may then signal to the operator while in driving position that something is amiss about his vehicle.

The longitudinal groove 25 in extension 1' avoids the making of a signal of significant deflation when, in fact, notwithstanding a possible slow leak, adequate pressure is being maintained, but without imparing the effectiveness of the unit should the pressure decline to a hazardous value.

It should be evident from the foregoing that the unit embodying this invention affords adequate protection in lieu of the usual valve cap against intrusion of foreign matter into the valve stem V, and while the signalling means will normally be removed therefrom during servicing of the tire, it is easily reset by mere light finger pressure against the warning rod 21 to return it to normal position within extension 1' after it has been projected by air from the tire to a position indicative of significant deflation. It will of course be recognized that gasket 26 when engaged by piston head 20 effectively prevents further escape of air from the tire after the bias of spring 15 has overcome the tire pressure acting against poppet 9 so no appreciable further deflation of the tire can occur through the signalling means.

THE MODIFIED EMBODIMENT

Figure 5:
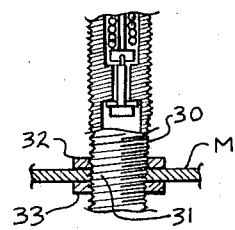
FIG. 5 is a fragmentary detail of a modified embodiment.
Figure 6:
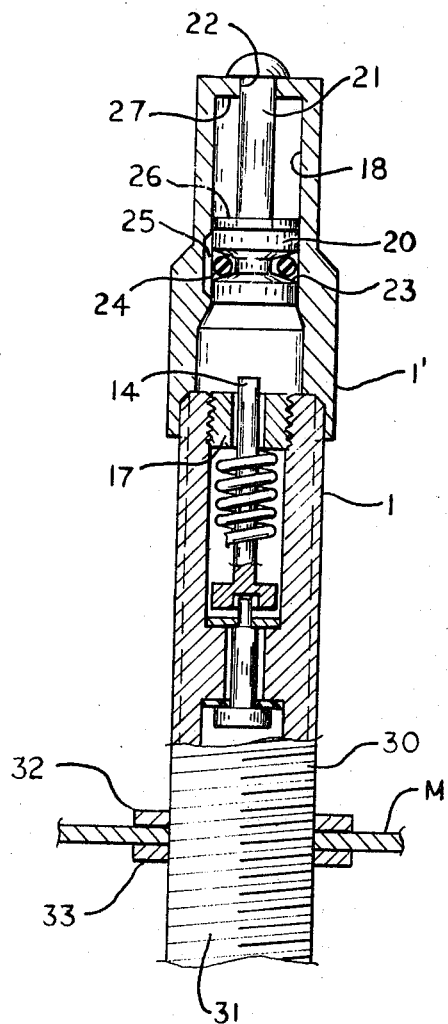
FIG. 6 is an axial section on an enlarged scale showing in addition to the structure illustrated in FIG. 4 the pressure-differential responsive valve through which air passes for actuating the plunger.
Figure 7:
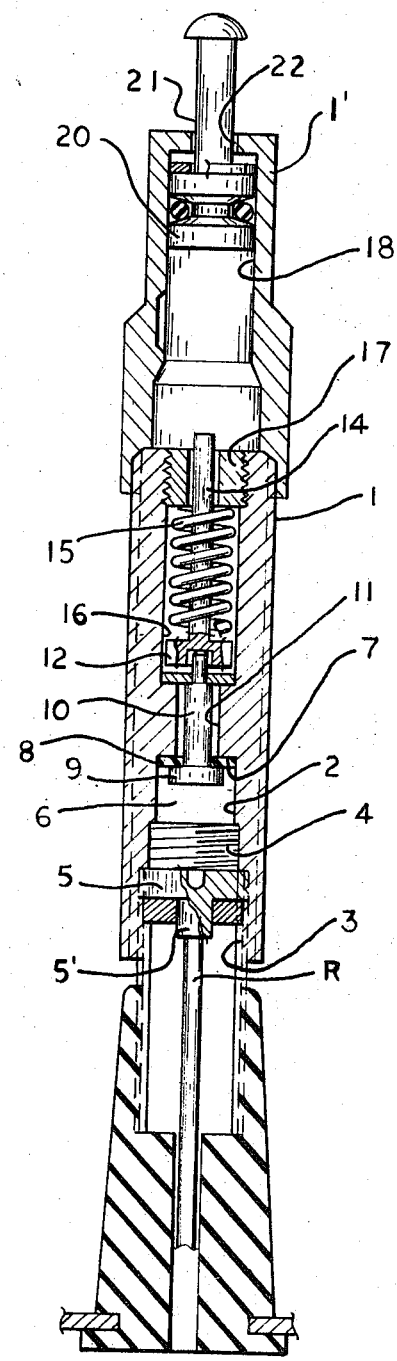
FIG. 7 is an axial section substantially corresponding to FIG. 3 but on a larger scale better to illustrate the structure therein shown.

There is fragmentarily illustrated in FIG. 5 a modified embodiment of the invention comprising a housing 20 communicating with the interior of a vehicle tire (not shown) mounted on a wheel rim M through the medium of external threads 31 on the housing, carrying nuts 32, 33 embracing the rim and sealing the communication of the housing with the interior of the tire, sealing gaskets (not shown) being employed in accordance with usual practices if desired. This signalling means, apart from this and the omission of the now superfluous valve depressor 5, is otherwise identical in construction and operation with the preferred embodiment of the invention.

I claim:

1. In combination with a container for gaseous fluid under pressure, a cylindrical housing having an axial bore communicating with the interior of the container, a pressure-differential-responsive valve in the housing bore, said pressure-differential-responsive valve comprising an annular valve seat projecting radially inwardly from the housing into said bore, a valve poppet operatively engaging said seat and having an axial stem projecting through said seat in the direction away form the container, an annular abutment disposed in said bore further from the container than said seat, and yielding means engaging said abutment and biasing said valve poppet stem toward the container in opposition to the pressure of fluid in the container against the valve poppet biasing the poppet toward said seat, and a piston disposed in the hosuing adjacent the free end thereof carrying a rod projectible axially from the housing by gaseous fluid released from said pressure-differential-responsive valve when the pressure of the gaseous fluid within the container attains a predetermined value less than a desired value.

2. A combination as defined in claim 1 in which an annular gasket is carried by said piston surrounding said rod and is engageable with a seat formed in the end of the housing to confine the gaseous fluid within the container after said pressure-differential-responsive valve has released said fluid therefrom in response to significant partial decrease of pressure of said fluid within the container.

3. A combination as defined in claim 1 in which said piston has an annular peripheral groove and carries therein a toroidal yielding gasket engageable with the inner wall of the housing.

4. A combination as defined in claim 1 in which the housing comprises separable axially aligned portions having complementary bores in which the valve and the piston respectively are seated.

5. In combination with a pneumatic vehicle tire, a cylindrical housing communicating with the interior of the tire, a pressure-differential-responsive valve in the housing responsive to pressure within the tire, said pressure-differential-responsive valve comprising an annular valve seat projecting radially inwardly from the housing into said bore, a valve poppet operativly engaging said seat and having an axial stem projecting through said seat in the direction away from the tire, an annular abutment disposed in said bore further from the tire than said seat, and yielding means engaging said abutment and biasing said valve poppet stem toward the tire in opposition to the pressure of fluid in the tire against the valve poppet biasing the poppet toward said seat, and pressure-actuated means carried by the housing projectible therefrom by air released from the tire by said valve.

6. A valve for normally confining a gaseous fluid in a container comprising a tubular housing, a substantially annular valve seat in the housing coaxial therewith and a valve poppet in the housing biased by the gaseous fluid in the container into sealing engagement with the valve seat.

* * * * *